July 30, 1940. A. E. NORRIS Re. 21,519
VACUUM CLEANER MUFFLER
Original Filed Feb. 27, 1937
Fig. 4.
Fig. 1.
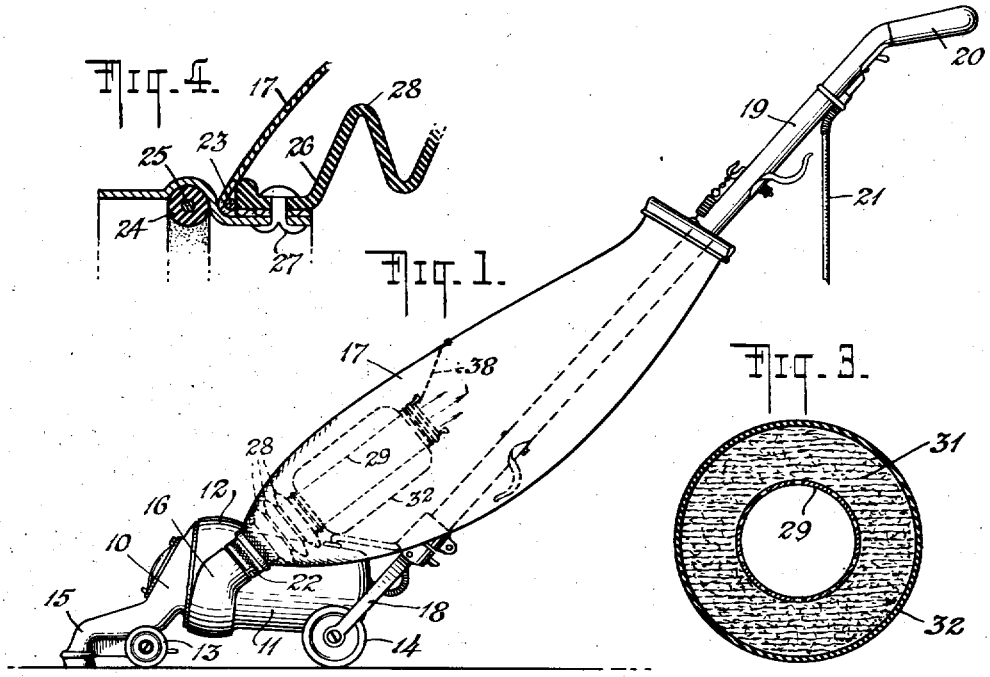
Fig. 3.
Fig. 2.
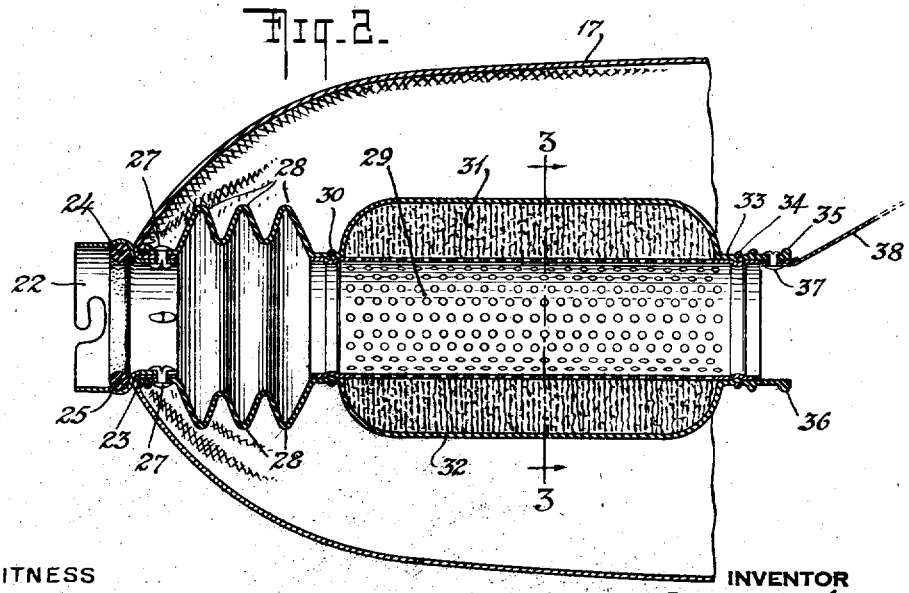
WITNESS
G. V. Rasmussen
INVENTOR
ALFRED E. NORRIS
BY
Wilson Hubbard
ATTORNEYS Reissued July 30, 1940 Re. 21,519

UNITED STATES PATENT OFFICE 21,519

VACUUM CLEANER MUFFLER

Alfred E. Norris, Westfield, N. J., assignor to The Regina Corporation, Rahway, N. J., a corporation of New Jersey Original No. 2,125,850, dated August 2, 1938, Serial No. 128,108, February 27, 1937. Application for reissue November 1, 1939, Serial No. 302,372

16 Claims. (Cl. 15—16)

The invention relates to a vacuum cleaner of the usual household type consisting of an ambulant frame, motor, suction fan, suction nozzle, dust bag, and a handle attached to the frame for guiding the cleaner over the surface to be cleaned.

More particularly, the invention relates to a novel construction of muffler incorporated in the bag of the standard type of such apparatus. Such muffler structure is designed for effectively reducing to an appreciable extent the noise emitted by the vacuum cleaner in operation and is characterized by certain features of construction such as the manner of supporting the same within the dust bag of the vacuum cleaner, conducive to producing the most efficient and effective functioning of the muffler, while at the same time contributing in large measure to the sturdiness of the structure and its ability to withstand shocks to which it may be subjected in the ordinary course of use of the cleaning device. My novel form of muffler structure and its support in the dust bag are characterized also by certain advantages, for instance in facilitating the operation of cleaning the dust bag.

The general form and structure of my novel muffler device is that described and shown in the application of Ernest J. Abbott, Serial No. 89,568, filed July 8, 1936, in which such general form of muffler structure is included in a blower unit, for instance, a vacuum cleaner, for the purpose of effecting a marked reduction in the usual noises emitted by a blower unit during its operation.

The present invention embodies certain improvements in the construction and the manner of supporting a muffler of such general type and is designed to overcome certain disadvantages attendant in the use of a muffler which does not embody the particular features of novelty hereinafter to be described.

One of the objects of the invention is to provide a muffler structure of unitary construction, including a means, integral with the body of the muffler, for connecting such body with the collar constituting the ingress means for the air blown through the dust bag.

A further object of the invention is to provide such a unitary muffler structure, including a resilient mounting therefor, in which the entire muffler and its resilient mounting are positioned within the dirt collecting portion of the dust bag. By means of this construction, any pivotal force applied to the handle attached to the frame of the cleaner, in guiding the cleaner over the surface to be cleaned, is transmitted to the muffler directly through the dust bag and functions to flex the muffler, through its resilient mounting, within the bag.

One form of connection as between the body of the muffler structure and such ingress collar, as disclosed and described in the Abbott application hereinabove referred to, is a rubber tube disposed between the outer periphery of the dust bag collar and the turned-in portion of the mouth of the dust bag. The muffler in such construction is constituted of a perforated cylindrical screen surrounded by a packing of wood fibre, the fibre and the screen being contained within an outer shell.

I have found that when employing a rubber tube as such connecting means, if such tube is sufficiently flexible to readily conform with all positions that the bag may assume while the cleaner is in use, the rubber connecting tube will tend to collapse when and as the muffler moves out of alignment with the central line of discharge, thereby constricting the passage through the tube and interfering with the free passage of air. On the other hand, if the tubing is made sufficiently rigid to prevent this tendency to collapse, the muffler because of its more rigid position in the bag, will interfere with the normal operation of the bag.

In accordance with my invention, therefore, I employ a novel construction of flexible tubing which is in the form of an accordion or bellows, and in the preferred embodiment of my invention, such accordion-like flexible tubing is integral with the casing of the muffler within which the perforated cylindrical screen and wood fibre packing are contained. In this manner, I secure a flexible connection between the muffler body and the dust bag collar, which is provided with means, pleats in the now-preferred embodiment of my invention, to prevent, when the connection or tubing is bent, any alteration of the effective cross-sectional area of such tubing.

A specific embodiment of the novel structure of a dust bag muffler constructed in accordance with my invention is illustrated in the accompanying drawing, in which Fig. 1 is a side view of a typical standard type of vacuum cleaner; Fig. 2 is a sectional detail view of a portion of the dust bag of such cleaner to which the muffler constructed in accordance with my invention has been applied; Fig. 3 is a section on the line 3—3 of Fig. 2 and Fig. 4 is an enlarged sectional detail of the manner of securement of the muffler structure to the dust bag.

Referring more particularly to the drawing, in which similar reference characters identify similar parts in the several views, 10 is the ambulant frame of the vacuum cleaner comprising a case or housing 11 for a horizontal motor, and a suction fan housing 12. The frame 10 and motor case 11 are mounted on pairs of wheels 13 supporting the forward end of the frame and a pair of wheels 14 supporting the rear portion of the frame and more particularly the motor case 11. A downwardly turned suction nozzle 15 protrudes forwardly from the ambulant frame. From the fan housing 12 extends a dust discharge pipe 16 to which is connected the usual dust bag 17 used with this type of vacuum cleaner. Pivotally mounted upon the shaft near the ends of which are secured the wheels 14, is the forked member 18 to which is connected the tubular handle 19 having the handle grip 20 and within which is secured a portion of the electric cable 21.

Secured to the end of the discharge pipe 16 by a bayonet joint is a dust bag collar 22. To such dust bag collar are secured, as shown clearly in Figs. 2 and 4, the dust bag 17 and the muffler housed therein by means of a collar attachment wire 23 and a rubber ring 24 stiffened by a wire core 25.

The end of the dust bag collar extends into the dust bag 17 and has secured to the outer periphery thereof a rubber tube 26 constituting a portion of the molded rubber housing of the muffler structure. Such rubber tube encompasses both the turned-in portion of the mouth of the dust bag and the dust bag collar, being secured in position by rivets 27—27.

The portion of the muffler housing designated as the rubber tube 26, is formed with a plurality of pleated sections 28, which sections form an accordion-like tubing, the peripheral wall of such tube in longitudinal section being formed of a plurality of bends, as clearly shown in Fig. 2. In the partcular embodiment illustrated in the drawing, the tube 26 as shown, is constituted of an accordion-like member having three pleats, but it is obvious that any number of such pleats may be employed, so long as a bellows effect is secured for the purposes hereinafter to be fully described.

Near the end of the accordion-like tube structure, removed from the dust bag collar, there is secured, so as to have the end thereof enter the rubber tube, a perforated cylindrical screen 29. The portion of the rubber tube 26 which extends over and upon the end of the perforated screen is crimped over such end by means of a wire 30.

Surrounding the perforated screen 29 is a packing of wood fibre 31 contained within the outer shell 32, which is preferably of rubber and preferably integrally molded with the tube 26 so as to constitute a housing for the packing of wood fibre and perforated screen. The outer shell 32 is formed with a mouth 33 overlying the end of the perforated screen remote from that which is secured to the tube 26. The end portion of the outer shell forming such mouth and which is in contact with the perforated screen is crimped over the end of such perforated screen and is secured thereto by means of a wire 34.

Molded integrally with the rubber outer shell 32 and extending from the mouth portion thereof 33, are two tabs 35, 36 for a purpose hereinafter more specifically referred to. To one of such flaps 35, being that which is the upper one when the muffler structure is secured within the vacuum cleaner dust bag, is secured by rivet 37, a tape 38 which at its other end is secured to the inner face of the dust bag at a point which will permit the muffler structure, including its flexible connection, to be supported within the dust bag in such position as to have the axis of the muffler, and more particularly the axis of the cylindrical perforated screen, substantially in alignment with the egrees end of the discharge pipe 16, as is clearly shown in Fig. 1.

The muffler constructed in accordance with my invention, therefore, comprises a molded outer shell or housing, a portion of which is constituted of a rubber tube of accordion-like structure having a bellows configuration which extends from the dust bag collar, a length of perforated screening extending from the end of such rubber tube and housed within the outer shell of molded rubber, and a quantity of wood fibre packed between the shell and perforated screen. The wood fibre is packed in such manner as to have its fibre disposed radially of the perforated screen and outer shell.

The novel muffler structure just described, including an acoustic absorption material is effective in reducing the noise produced by the vacuum cleaner in operation and is effective so as to reduce such noise without interference with the filtering function of the bag and without any interference with the air flowing therethrough.

The novel construction of dust bag muffler in which the flexible connection of the muffler to the air inlet is constituted of an accordion-like tube, has a number of advantages which will now be more specifically set forth.

As hereinabove stated, when an ordinary rubber tube is used as a flexible connection, such ordinary rubber tube will tend to collapse when and as the muffler moves out of alignment with the central line of discharge and constrict the passage through the tube. By forming such connecting tubing in the form of a bellows structure or, as hereinabove described, with a plurality of pleats so as to form such tube in the shape of an accordion, the muffler can be supported by such tube connection without the tube collapsing, no matter to what extent the tube may be bent. Thus, it will be seen that if the position of the muffler structure is to any extent changed from that in which it is in perfect alignment with the central line of the discharge pipe 16, the effective cross-sectional area of the passage through the connecting tube will be maintained constant, as no collapsing of such connecting tube can take place, there being sufficient material provided by the pleats to take care of any extension at any point along the length of the tube.

The flexible connection as particularly described hereinabove, has the additional advantage that in the course of cleaning the dust bag, which operation includes the removal of the dust and dirt collected therein, the muffler structure itself acts in the nature of a bell clapper. In performing the cleaning operation, the dust bag containing the muffler structure is removed from the frame and may be held by the collar 22 and the dust bag shaken. The accordion-pleated flexible connection between the muffler structure and the dust bag collar will permit the muffler structure to act as a bell clapper, striking the sides of the dust bag while the bag is being shaken so as to loosen particles of dust and dirt which have adhered to the sides of the bag.

The dust bag structure and novel connection thereof which, in accordance with my preferred embodiment, are constituted of a single piece of molded rubber forming the connecting tube and the outer shell, has the additional advantage of being capable of withstanding the many knocks to which the vacuum cleaner is subjected both during use of the cleaner and during the operation of cleaning the dust bag. Furthermore, by making the outer shell of the muffler structure of rubber, molded in one piece with the flexible connection, any wearing of the bag by contact with the inner surface thereof by a metallic shell, is prevented.

The molding of the outer shell in one piece with the flexible connecting tube also permits easy and rapid assembly of the muffler structure. By providing the flaps 35 and 36 at the mouth of the rubber shell 32, there are provided means by which the mouth of the outer shell may be extended with facility for the introduction into the shell of the perforated cylindrical screen 29 through such mouth and the easy and rapid packing of the wood fibre into the space between the perforated cylinder and the outer shell. This is accomplished by grasping the two flaps 35 and 36 and pulling them apart to an extent sufficient to enlarge the mouth of the shell to permit the insertion of the perforated tube and then the packing of wood fibre. When the flaps are released, the mouth will be again contracted so as to overlie the peripheral surface of the perforated screen and the wire 34 may then be secured in place.

Mention has been made hereinbefore of the effect of the dust bag muffler structure, just described, in reducing the noise emitted by the vacuum cleaner during operation. This is due in great measure to the use of a rubber shell which serves, together with the accordion-pleated connection, as a noise-dampening element. The reduction in noise is marked and readily noticeable in a comparison of the noise emitted by a vacuum cleaner provided with a dust bag muffler structure constructed in accordance with my invention and a dust bag muffler structure not embodying the features of novelty herein disclosed.

While I have described a specific embodiment of my invention, it is obvious that various changes be made therein, particularly in the arrangement and configuration of the several elements described, without departing from my invention.

I claim:

1. A muffler structure, comprising an acoustic absorption material, for the dust bag of a vacuum cleaner, including a flexible tube connection between the muffler elements and the dust bag collar, said flexible tube connection having means to prevent any alteration in the effective interior cross-sectional area of the tube when such tube is bent, the entire muffler and its flexible tube connection being positioned within the dirt-filtering portion of said dust bag.

2. A muffler structure, comprising an acoustic absorption material, for the dust bag of a vacuum cleaner, including a resilient mounting therefor, said resilient mounting having means to prevent any alteration in the effective interior cross-sectional area thereof when it is bent, the entire muffler and its resilient mounting being positioned within the dirt-filtering portion of said dust bag.

3. A muffler structure for the dust bag of a vacuum cleaner comprising a cylindrical perforated screen, a body of fibrous material surrounding the screen, an outer shell containing said screen and said body of fibrous material and a flexible connection between said outer shell and the collar of the dust bag, said outer shell and said flexible connection being formed of a single piece of molded rubber.

4. A muffler structure for the dust bag of a vacuum cleaner comprising a cylindrical perforated screen, a body of fibrous material surrounding the screen, an outer shell containing said screen and said body of fibrous material and a flexible connection between said outer shell and the dust bag collar, which flexible connection comprises a rubber tube provided with means to maintain constant, when said tube is bent, the effective interior cross-sectional area of the air passage within said tube, said outer shell and said flexible connection being formed of a single piece of molded rubber.

5. In a vacuum cleaner, an ambulant frame, electric motor, suction fan, suction nozzle and a dust bag, said dust bag having a muffler structure, comprising an acoustic absorption material, resiliently mounted therein by means of an accordion-like rubber tube, the entire muffler and its resilient mounting being positioned within the dirt-filtering portion of said dust bag, whereby any pivoting force exerted upon the bag is transmitted through the bag to flex the muffler.

6. A muffler structure for the dust bag of a vacuum cleaner, comprising an outer shell containing an acoustic absorption material and a resilient mounting therefor, said resilient mounting having means to prevent any alteration in the effective interior cross-sectional area thereof when it is bent, the entire muffler and its resilient mounting being positioned within the dirt-filtering portion of said dust bag, said outer shell being provided with a constricted mouth having a pair of tabs by means of which said mouth may be enlarged.

7. A muffler structure as claimed in claim 3 in which the outer shell is provided with a constricted mouth having a pair of tabs by means of which said mouth may be enlarged.

8. A muffler structure for the dust bag of a vacuum cleaner, comprising an outer shell containing an acoustic absorption material and a resilient mounting therefor, said resilient mounting having means to prevent any alteration in the effective interior cross-sectional area thereof when it is bent, the entire muffler and its resilient mounting being positioned within the dirt-filtering portion of said dust bag, said outer shell being provided with a constricted mouth having a tab and a tape connection between said tab and a point on the interior surface of the dust bag for supporting the muffler structure in a position of alignment with the dust discharge pipe of the bag.

9. A muffler structure as claimed in claim 3 in which the outer shell is provided with a constricted mouth having a tab and a tape connection between said tab and a point on the interior surface of the dust bag for supporting the muffler structure in a position of alignment with the dust discharge pipe of the bag.

10. A muffler structure for the dust bag of a vacuum cleaner, comprising an outer shell containing an acoustic absorption material and a resilient mounting therefor, said resilient mounting having means to prevent any alteration in the effective interior cross-sectional area thereof when it is bent, the entire muffler and its resilient mounting being positioned within the dirt-filtering portion of said dust bag, said outer shell being provided with a constricted mouth having a pair of tabs by means of which said mouth may be enlarged, and a tape connection between one of said tabs and a point on the interior surface of the dust bag for supporting the muffler structure in a position of alignment with the dust discharge pipe of the bag.

11. A muffler structure as claimed in claim 3 in which the outer shell is provided with a constricted mouth having a pair of tabs by means of which said mouth may be enlarged, and a tape connection between one of said tabs and a point of the interior surface of the dust bag for supporting the muffler structure in a position of alignment with the dust discharge pipe of the bag.

12. A muffler structure for the dust bag of a vacuum cleaner comprising a cylindrical perforated screen, a body of an acoustic absorption material surrounding the screen and an outer shell of a single piece of molded rubber containing said screen and said body of acoustic absorption material.

13. A muffler structure as claimed in claim 12 in which the outer shell is provided with a constricted mouth having a pair of tabs by means of which said mouth may be enlarged.

14. A muffler structure as claimed in claim 12 in which the outer shell is provided with a constricted mouth having a tab and a tape connection between said tab and a point on the interior surface of the dust bag for supporting the muffler structure in a position of alignment with the dust discharge pipe of the bag.

15. A muffler structure as claimed in claim 12 in which the outer shell is provided with a constricted mouth having a pair of tabs by means of which said mouth may be enlarged, and a tape connection between one of said tabs and a point on the interior surface of the dust bag for supporting the muffler structure in a position of alignment with the dust discharge pipe of the bag.

16. In a vacuum cleaner, a dust bag having a collar, a muffler comprising an acoustic absorption material, an outer shell containing said muffler and a flexible connection between said muffler and dust bag collar, said flexible connection and outer shell being integral.

ALFRED E. NORRIS.